Oct. 9, 1951        G. GUARINO        2,570,663
BIRD CAGE PERCH
Filed Feb. 24, 1948
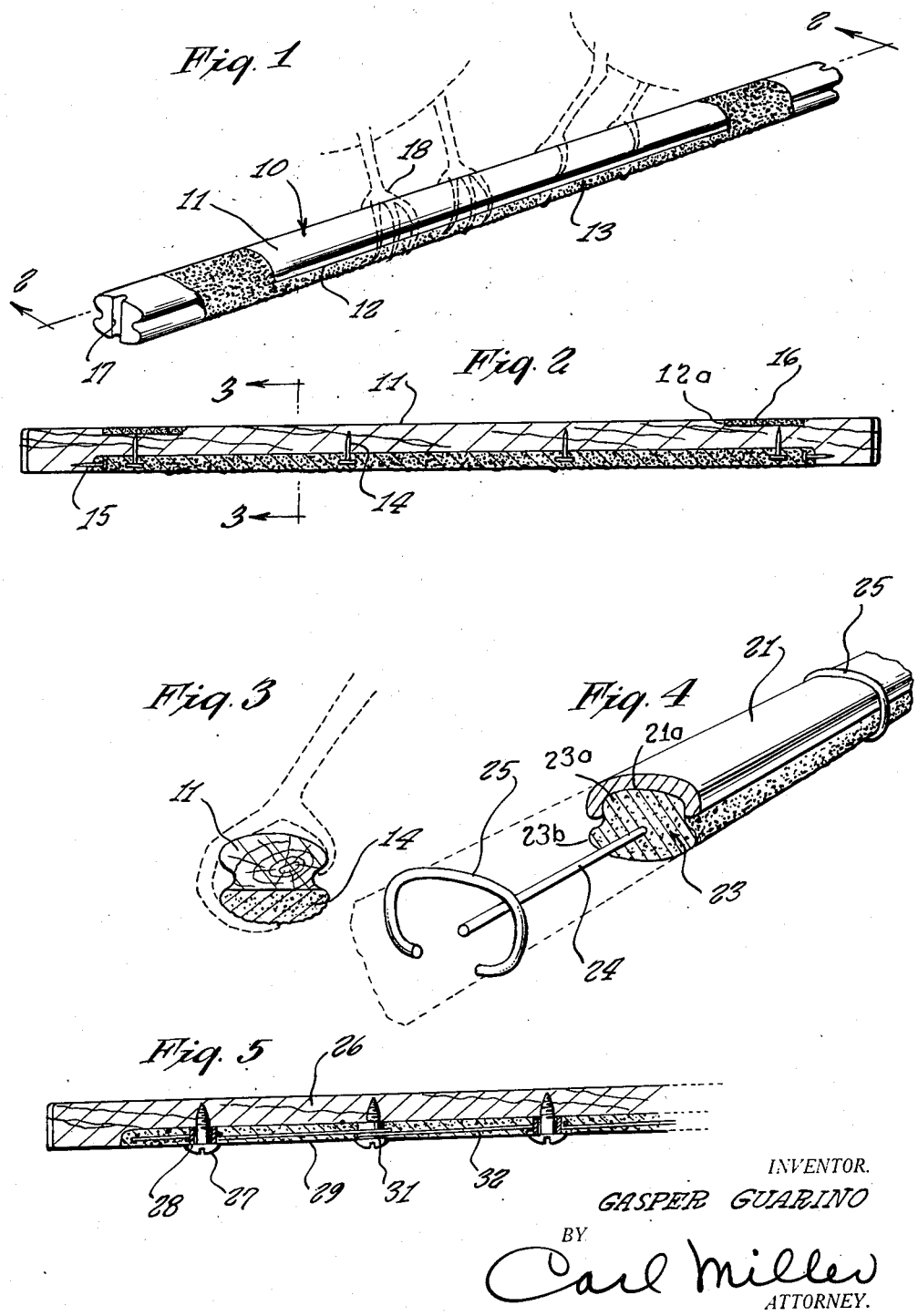
INVENTOR.
GASPER GUARINO
BY
Carl Miller
ATTORNEY.

Patented Oct. 9, 1951

2,570,663

UNITED STATES PATENT OFFICE 2,570,663

BIRD CAGE PERCH

Gasper Guarino, Brooklyn, N. Y., assignor of fifty per cent to Murray Lasher, Brooklyn, N. Y.

Application February 24, 1948, Serial No. 10,254

1 Claim. (Cl. 119—26)

This invention relates to bird cage perches.

It is an object of the present invention to provide a bird cage perch which has abrasive material which is fastened to the under parts of a wood piece and which is reinforced with wire, wherein the foot of the bird will be extended onto the abrasive material to file its claws, which otherwise would need periodical clipping, while at the same time the under portions of the bird's foot will not be resting upon the abrasive material, and wherein at the sides of the perch, there is provided abrasive material in a small area whereof, whereby access can be had for the bird to sharpen its beak.

Another object of the present invention is to provide a bird cage perch which permits the bird to file its claws without injuring the feet, or the veins in the bird's claws.

Another feature of this invention resides in the fact that the bird's health is not impaired by pecking away upon any foreign matter of the bird cage perch, since parts of the bird cage perch consist of materials that are not injurious to the health of any birds.

Other objects of the present invention are to provide a reinforced abrasive bird cage perch which is of simple construction, inexpensive to manufacture, easy to install, and efficient in operation.

For other objects and for a better understanding of the invention, reference may be had to the following detailed description taken in connection with the accompanying drawing, in which Fig. 1 is a perspective view of the perch embodying the features of the present invention having the abrasive material formed thereon and illustrating the manner in which the bird's feet engage with the same.

Fig. 2 is a longitudinal sectional view of the perch taken on line 2—2 of Fig. 1.

Fig. 3 is a transverse sectional view of the perch.

Fig. 4 is a fragmentary and enlarged perspective view of the perch with certain of the abrasive material broken away to show the reinforcing and the modified manner of attaching the abrasive material to the top piece.

Fig. 5 is a fragmentary longitudinal sectional view similar to Fig. 2 of a modified form of the invention utilizing a different reinforcing arrangement.

Referring to the figures, 10 represents a perch constructed according to one form of the invention, wherein there is provided a wood piece 11 having a recessed portion 12 in its bottom face which receives abrasive material 13. This abrasive material is formed on the wood piece 11 by first adding reinforcing tack elements 14 on the wood piece 11 and then molding abrasive material 13 about the same. The tacks may extend into the end of the recess as indicated at 15 and will accordingly retain sections of the abrasive material. Accordingly the abrasive has been reinforced throughout the length of the same. On the top of the wood piece 14, there are provided near the ends small transverse grooves 12a of limited area in which abrasive material 16 is extended.

In the ends of the perch are vertically extending recesses 17 which fit about the wires of the cage so that the perch will be retained between wires against lateral displacement.

The bird's claw is indicated at 18 and will extend about the wood piece 11 and onto the abrasive to perfect the grip of the bird upon the perch.

Referring now to Fig. 4, there is shown a modified form of the arrangement wherein there is provided an upper bar or composite elongated bird cage perch comprising a top piece 21 of channel shape which is made of wood similar to the perch shown in Figure 1 and arranged in an inverted manner to form a keyway 21a so that there is received beneath the same a key 23a of a lower bar 23 of abrasive material. This abrasive material 23 is formed as a separable element, the lower side walls 23b being wider than the key 23a, and has a reinforcing wire 24 extending through the center so as to retain portions of the abrasive material in case other portions have been severed from the wire. This lower bar 23 is retained in place in the upper bar 21 by split rings 25 which will extend over the channel and have its ends lie beneath the abrasive material and brought together to retain the abrasive material in the keyway channel in a tight fitting manner, so that abrasive material can be replaced if worn or broken.

It is to be noted that the upper channel shape or bar 21 provides a keyway in which the upper portion of the lower abrasive material or bar 23 fits in linear alinement. It will be noted that the lower abrasive bar has two claw engaging side walls at its lower elevation and that this lower portion is considerably wider than the key portion and extends to substantially the full width of the upper bar, to cause engagement with the claws of the bird with the said abrasive sides.

In Fig. 5, there is shown a still further form of the invention wherein there is provided a removable abrasive which is retained on a wood piece 26 by means of screws 27 extending through sleeves or grommets 28 of a separable abrasive piece 29. Turned about these sleeves 28 are turns 31 of a reinforcing wire 32 which extends throughout the length of the abrasive material. There are several screws 27 which retain the abrasive 29 in place. It will be noted that the abrasive material can be replaced if worn or broken.

It will be further distinctly understood that any abrasive composition such as emery stone, sand stone, or any equivalent, may be substituted for concrete, if so desired.

While various changes may be made in the detail construction, it shall be understood that such changes shall be within the spirit and scope of the present invention as defined by the appended claim.

Having thus set forth and disclosed the nature of my invention, what is claimed is:

In a composite bird cage perch, an elongated upper bar made of wood and comprising an upper foot-supporting surface, an elongated lower bar made of abrasive material, said upper bar having a keyway in its lower surface, said lower bar having a key in its upper surface engageable with said keyway to cause linear alinement of said bars, split rings mounted transversely of said bars and in tight fitting relation with said bars for detachably securing said bars in said aligned relation, said lower bar having two claw-engaging side walls, the lower portion of said lower bar being considerably wider than said key and extending in augmented width below said wood bar to substantially the full width of the upper bar to cause engagement of the claws of the bird with said abrasive side walls.

GASPER GUARINO.

REFERENCES CITED

The following references are of record in the file of this patent:

UNITED STATES PATENTS

| Number | Name | Date |
|---|---|---|
| 775,603 | Jahnke | Nov. 22, 1904 |
| 966,523 | Carmichael | Aug. 9, 1910 |
| 1,255,655 | Squires | Feb. 5, 1918 |
| 1,297,811 | Ebbels | Mar. 18, 1919 |
| 1,747,476 | Klein | Feb. 18, 1930 |
| 2,076,734 | Leindorf | Apr. 13, 1937 |
| 2,241,259 | Hanson | May 6, 1941 |